(12) United States Patent
Wickstone et al.

(10) Patent No.: US 8,800,529 B2
(45) Date of Patent: Aug. 12, 2014

(54) DUAL FUEL INJECTION VALVE

(71) Applicant: Westport Power Inc., Vancouver (CA)

(72) Inventors: Michael C. Wickstone, Richmond (CA); Philip G. Hill, Vancouver (CA); Jian Huang, Richmond (CA); Sandeep Munshi, Delta (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 14/106,713

(22) Filed: Dec. 13, 2013

(65) Prior Publication Data

US 2014/0123937 A1    May 8, 2014

Related U.S. Application Data

(63) Continuation of application No. PCT/CA2012/050348, filed on May 28, 2012.

(51) Int. Cl.
*F02M 61/12* (2006.01)
*F02D 19/08* (2006.01)

(52) U.S. Cl.
USPC ....... 123/304; 123/27 GE; 123/525; 123/526; 123/575; 239/533.11

(58) Field of Classification Search
CPC .... F02M 61/12; F02M 21/0263; F02D 19/08; F02D 41/0027
USPC ............. 123/27 GE, 299, 304, 525, 526, 575; 239/533.11, 585.5
See application file for complete search history.

(56) References Cited

U.S. PATENT DOCUMENTS

| | | | |
|---|---|---|---|
| 4,693,424 A * | 9/1987 | Sczomak | 239/453 |
| 5,722,373 A | 3/1998 | Paul et al. | |
| 6,073,862 A | 6/2000 | Touchette et al. | |
| 6,336,598 B1 | 1/2002 | Touchette et al. | |
| 6,375,098 B1 * | 4/2002 | Fuseya et al. | 239/533.11 |
| 6,439,192 B1 | 8/2002 | Ouellette et al. | |
| 6,761,325 B2 | 7/2004 | Baker et al. | |
| 7,124,959 B2 | 10/2006 | Baker et al. | |
| 2011/0100332 A1 * | 5/2011 | Reiter | 123/490 |

FOREIGN PATENT DOCUMENTS

| | | |
|---|---|---|
| EP | 1234966 A2 | 8/2002 |
| JP | H10-026058 | 1/1998 |

OTHER PUBLICATIONS

Li, G., et al. "Optimization study of pilot-ignited natural gas direct-injection in diesel engine", SAE Technical Paper 1999-01-3556, Oct. 1999.
Office Action issued on Sep. 12, 2011, in connection with Canadian Patent Application No. 2,743,043.
International Search Report and Written Opinion issued on Jul. 18, 2012, in connection with International Application No. PCT/CA2012/050348.
International Preliminary Report on Patentability issued on Jan. 3, 2014, in connection with International Application No. PCT/CA2012/050348.

* cited by examiner

*Primary Examiner* — Erick Solis
(74) *Attorney, Agent, or Firm* — Corridor Law Group, P.C.

(57) ABSTRACT

A dual fuel injection valve with concentric needles comprises an inner needle and an outer needle surrounding the inner needle, both needles being located inside the injection valve body. The valve is provided with a first set and a second set of orifices for separately injecting two different fuels directly into the combustion chamber of an internal combustion engine. The outer needle is fixed against rotation with respect to the injection valve body such that an interlace angle between the centerlines of the first series of orifices and second series of orifices is set at different predetermined angles to reduce methane emissions.

31 Claims, 11 Drawing Sheets

DUAL FUEL INJECTION VALVE

CROSS-REFERENCE TO RELATED APPLICATIONS

This application is a continuation of International Application No. PCT/CA2012/050348 having an international filing date of May 28, 2012 entitled "Dual Fuel Injection Valve". The '348 international application claimed priority benefits, in turn, from Canadian Patent Application No. 2,743,043 filed on Jun. 14, 2011. The '348 international application is hereby incorporated by reference herein in its entirety.

FIELD OF THE INVENTION

The present invention relates to a dual fuel injection valve with concentric needles for separately injecting two different fuels into the combustion chamber of an internal combustion engine.

BACKGROUND OF THE INVENTION

Because of its ready availability, low cost and potential for reducing particulate emissions, natural gas is gaining acceptance as a fuel for internal combustion engines. Natural gas is only one example of a gaseous fuel with such benefits that can replace diesel in internal combustion engines while achieving similar performance to diesel-fuelled engines with lower particulate matter and/or nitrogen oxide (NOx) emissions. While this disclosure relates to natural gas fuelled engines, other suitable gaseous fuels such as hydrogen, propane, ethane, butane, methane, and mixtures thereof can also be used as substitutes for diesel to achieve similar benefits.

Early approaches to fuelling internal combustion engines with natural gas mixed natural gas with the intake air prior to the introduction into the engine cylinder (a process known as "fumigation"). Because natural gas has a higher auto-ignition temperature than diesel, in these engines a pilot amount diesel fuel was injected directly into the combustion chamber near top dead center to trigger ignition of the natural gas. However, pre-mixing natural gas and air in this manner limits the amount of diesel that can be substituted with natural gas and/or the compression ratio that can be safely used, because fumigating too much natural gas can result in engine knock, which is premature detonation of the fuel that can damage the engine. Another disadvantage of fumigated engines is that under low load engine operating conditions, the pre-mixed homogeneous mixture of natural gas and air becomes too lean to burn. Consequently, engines that introduce natural gas by fumigation have not been able to match the power, performance, and efficiency of equivalently-sized diesel engines.

More recently an improved type of dual fuel internal combustion engine has been developed, herein referred to as a "high pressure direct injection" (HPDI) gaseous-fuelled engine. Herein "direct injection" is defined to mean injection of the fuel directly into the combustion chamber through nozzle orifices that communicate directly with the combustion chamber. That is, in an HPDI gaseous-fuelled engine, none of the fuel is injected into the intake manifold or intake ports. One approach to this type of engine uses a pilot amount of diesel fuel to trigger ignition of the gaseous fuel but the main difference is that the gaseous fuel is injected directly into the combustion chamber so that it burns in a combustion mode that is more similar to a conventional diesel engine, in which fuel is directly injected into the combustion chamber late in the compression stroke or early in the power stroke when the piston is near top dead center. Accordingly, with an HPDI gaseous-fuelled engine the amount of gaseous fuel that can be injected is not knock-limited because with the fuel being injected later in the engine cycle, there is no danger of premature detonation. Also, at low load operating conditions because the fuel is not pre-mixed, and instead burns in a diffusion combustion mode, the same challenges that fumigated engines have with these operating conditions are not encountered with HPDI gaseous-fuelled engines. Unlike fumigated engines, pilot-ignited HPDI gaseous-fuelled engines have been proven to achieve substantially the same combustion efficiency, power and torque output as state of the art diesel engines, while on average using natural gas for at least about 95% of the total fuel consumed on an energy basis. A challenge associated with the operational principle underlying pilot-ignited HPDI gaseous-fuelled engines is that means must be provided for injecting the gaseous fuel and the pilot fuel directly into the combustion chamber. Modern internal combustion engines can typically have two intake valves and two exhaust valves and these valves occupy a substantial amount of the space in the cylinder head above the combustion chamber. Consequently, it can be a problem finding enough space in the cylinder head to install a second fuel injector. A solution has been to design a dual fuel injector that provides two separate injectors in one body. Following this approach, the applicant has developed many different designs with concentric valves, wherein a smaller pilot fuel injection valve is positioned in the middle, with the body of the pilot fuel valve acting as the needle for a gaseous fuel injection valve, which is concentrically arranged in the annular space around the pilot fuel injection valve. Examples of these designs are disclosed in co-owned U.S. Pat. Nos. 6,073,862, 6,336,598, 6,761,325 and 7,124,959.

A problem observed with pilot-ignited HPDI engines employing concentric gaseous and liquid fuel injection valves is that there can be periodic variations in engine speed and NOx emissions. The amplitude of these variations can be particularly large when the load is small. These variable conditions can lead to irregular engine operation. Previously known concentric gaseous and liquid injection valves have had an inner needle valve that is free to rotate around its longitudinal axis. Advantages of this design include simplification which results in easier and lower cost manufacturing. Also, it was believed that it is best to allow the inner pilot fuel valve body to rotate freely to better adapt to the different characteristics of each cylinder in a multi-cylinder engine, and it was believed that a fixed interlace angle would be difficult to optimize for every cylinder. The experiments have shown that unstable engine speed can be attributed to variations in combustion quality that are believed to be caused by variations in the interlace angle especially when there is an equal number of gaseous and pilot fuel orifices. The interlace angle is defined as the angle between the axis of a gaseous fuel jet and that of the pilot fuel spray, neighboring the gaseous fuel jet, as viewed in the direction of the injection valve's longitudinal axis, which is a view that is typically depicted as a top or bottom view of the combustion chamber (that is, the view depicted in FIGS. 6 and 9, described later). Co-owned U.S. Pat. No. 6,439,192 teaches a solution to reduce such variations by using an injection valve that has an unequal number of pilot fuel and gaseous fuel orifices.

While the solution taught by the '192 patent might solve the problem for an engine with concentric gaseous and liquid fuel injection valves positioned in the center of the cylinder, it would not be a desirable solution for all engine configurations. For example, a different solution is needed for a concentric arrangement of gaseous and liquid fuel injection valves that is positioned off-center or in an inclined position.

When an injector comprising a concentric arrangement of needle valves with a freely rotating inner needle valve, as described in the above patents, is placed in an off-center or in an inclined position with respect to the longitudinal axis of the combustion chamber, a freely rotating pilot fuel injection valve could introduce more variability in the engine performance caused by uneven distribution of fuel within the combustion chamber and the effect of interaction of the fuel jets with the combustion chamber walls, the piston or the cylinder head.

Because there is a desire to continually improve the performance of internal combustion engines, to increase efficiency, increase power, reduce emissions, and increase combustion stability and robustness, there is a need for new and different approaches to dual fuel injector design that would further reduce the variability of the combustion process taking place within the combustion chamber of a direct injection internal combustion engine.

SUMMARY OF THE INVENTION

A dual fuel injection valve is disclosed for separately injecting two different fuels directly into a combustion chamber of an internal combustion engine. The dual fuel injection valve comprises:
(a) a valve body;
(b) a hollow outer needle disposed within the valve body, having a longitudinal axis along which it is movable between a closed position and an open position for injecting a first fuel into the combustion chamber through a first series of orifices located at an end of the valve body which faces the combustion chamber;
(c) an inner needle disposed within the outer needle having a longitudinal axis along which it is movable between a closed position and an open position for injecting a second fuel into the combustion chamber through a second series of orifices located at an end of the outer needle which faces the combustion chamber;
(d) an actuator assembly operative to move the inner needle and the outer needle between their respective closed and open positions to separately inject an amount of pilot fuel and an amount of gaseous fuel into the combustion chamber, and
(e) a keying member disposed between the outer needle and the valve body in an elongated channel formed by a recess in one of an outer surface of the outer needle and an inner surface of the valve body, the keying member being held in a fixed radial position relative to the elongated channel to inhibit the outer needle from rotating relative to the valve body.

Because the outer needle if kept in a fixed radial position relative to the valve body the interlace angle between the respective centerlines of the first series of orifices and the second series of orifices is kept at a fixed predetermined value.

The keying member can be, for example, an integral part of the outer needle or of the valve body.

In a preferred embodiment, the keying member is a ceramic ball and in other embodiments, the keying member can have a polygonal cross-section.

The elongated channel formed by a recess in one of the outer surface the outer needle and the inner surface of the valve body is shaped to conform to the shape of the keying member.

In some embodiments, a plurality of keying members can be disposed between the outer needle and the valve body. In such embodiments each of the plurality of keying members is disposed in an elongated channel formed by a recess in one of an outer surface of the outer needle and an inner surface of the valve body and it is held in a fixed radial position relative to its respective elongated channel to inhibit the outer needle from rotating relative to the valve body.

The orifices from the first series of orifices can be equally spaced radially around the end of the valve body and the orifices from the second series of orifices can be equally spaced radially around the end of the hollow outer needle.

The number of orifices in the first series of orifices located at the end of the valve body can be equal to the number of orifices in the second series of orifices located at the end of the hollow outer needle.

In a preferred embodiment, the number of orifices in the first series of orifices is equal to the number of orifices in the second series of orifices and it is equal to 9.

In a preferred embodiment, the orifices in the first series of orifices or second series of orifices are equal in size.

In some other embodiments the orifices in the first series of orifices are not equal in size. Such embodiments generally apply when the injection valve is positioned off-center relative to the longitudinal axis of the combustion chamber or the longitudinal axis of the injection valve is inclined relative to the longitudinal axis of the combustion chamber.

In preferred embodiments, the first series of orifices are vertically offset from the second series of orifices along the longitudinal axis of the injection valve.

In some embodiments, the fixed interlace angle, established between respective centerlines of the first series of orifices and the second series of orifices, is set between 0 degrees and 20 degrees. In preferred embodiments, the fixed interlace angle, established between respective centerlines of the first series of orifices and the second series of orifices, is one of either 0 degrees or 20 degrees.

The outer surface of the outer needle can be provided with at least one additional recess, each recess forming an elongated channel wherein the keying member can be disposed to thereby establish a different fixed interlace angle.

Similarly, the inner surface of the valve body can be provided with at least one additional recess, each recess forming an elongated channel wherein the keying member can be disposed to thereby establish a different interlace angle.

The fixed interlace angle established between respective centerlines of the first series of orifices and the second series of orifices can be determined based on at least one of the following:
(a) an injection angle at which first fuel or second fuel are injected into the combustion chamber,
(b) an engine swirl number,
(c) the number of orifices in the first series or the second series of orifices, or
(d) a nozzle orifice offset distance.

The fixed interlace angle can be set according to at least one of the above parameters such that an equivalence ratio measured within a boundary volume between one fuel jet of first fuel injected in the combustion chamber and a second fuel jet injected in the combustion chamber, neighboring the first fuel jet, has a value within a range of 0.7 and 2.

In yet some other embodiments a fixing member is disposed between the valve body and engine's cylinder head where the valve body is located to inhibit the relative movement between the valve body and the cylinder head.

In a preferred embodiment, the hollow outer needle can be concentrically arranged with respect to the inner needle.

The first fuel can be a gaseous fuel selected from the group consisting of natural gas, hydrogen, propane, ethane, butane, methane, and mixtures thereof.

The second fuel can be a pilot fuel selected from the group consisting of diesel fuel, dimethylether, bio-diesel and kerosene.

A method is provided for separately injecting two different fuels through a dual fuel injection valve directly into a combustion chamber of an internal combustion engine. The method comprises injecting at least one first fuel jet directly into the combustion chamber through an orifice from a first series of orifices located at an end of the dual fuel injection valve and injecting at least one second fuel jet directly into the combustion chamber through an orifice from a second series of orifices located at the same end of the dual fuel injection valve wherein the first series of orifices are separate and space apart from the second series of orifices and an interlace angle between a first jet of first fuel and a second jet of second fuel, neighboring the first jet, is set at a fixed predetermined value.

The method can further comprise injecting an equal number of first fuel jets and second fuel jets into the combustion chamber. In preferred embodiments the number of the first fuel jets and the number of second fuel jets is 9.

In some embodiments the interlace angle is set between 0 degrees and 20 degrees. In other embodiments the interlace angle can also be either 20 degrees or 0 degrees.

In the present method the first fuel can be a gaseous fuel selected from the group consisting of natural gas, hydrogen, propane, ethane, butane, methane, and mixtures thereof and the second fuel can be a pilot fuel selected from the group consisting of diesel fuel, dimethylether, bio-diesel and kerosene.

BRIEF DESCRIPTION OF THE DRAWINGS

The drawings illustrate specific preferred embodiments of the invention, but should not be considered as restricting the spirit or scope of the invention in any way.

DETAILED DESCRIPTION OF PREFERRED EMBODIMENT(S)

Figure 1:
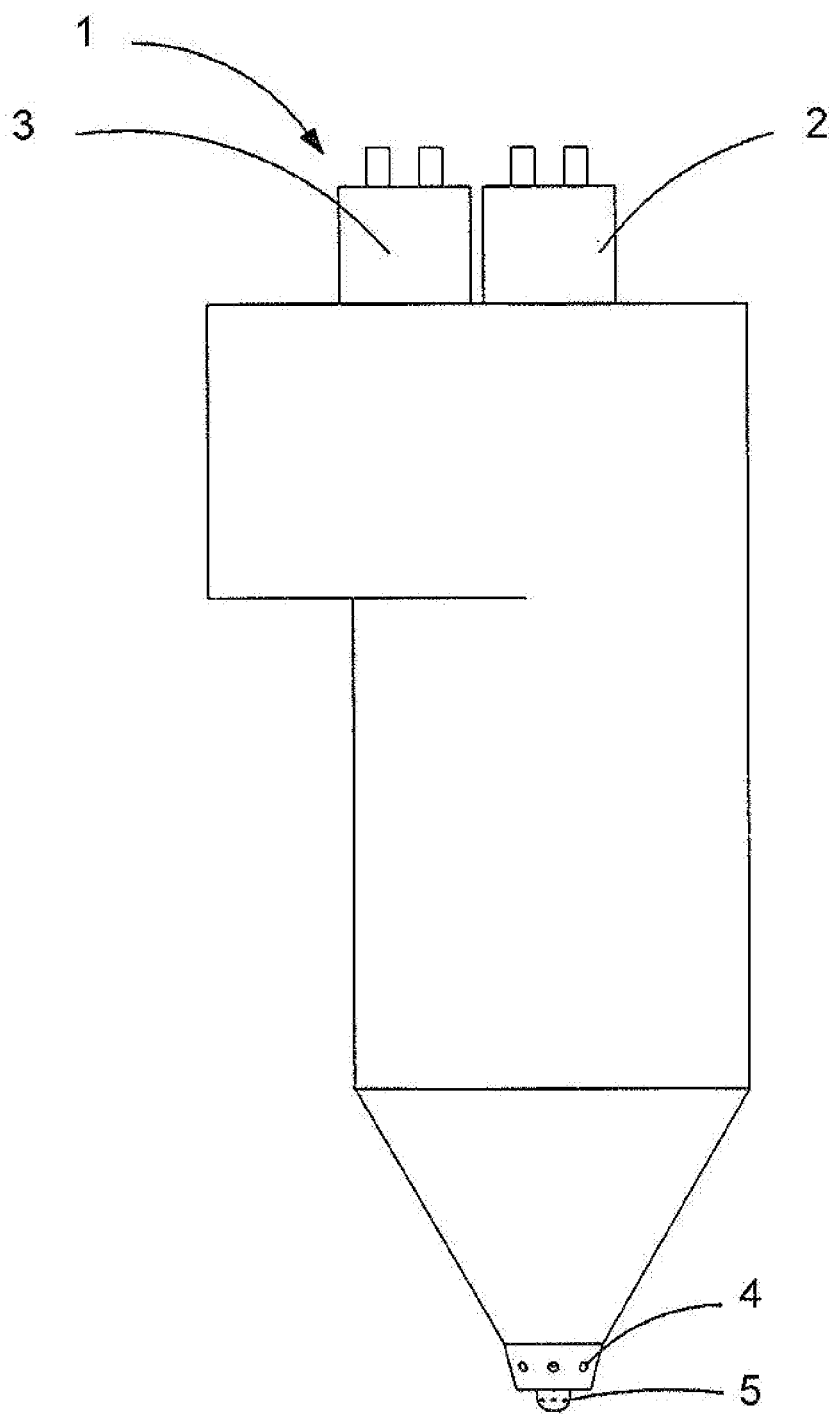
FIG. 1 illustrates a side view schematic illustration of a dual fuel injection valve with concentric needles with separate orifices for independently injecting two different fuels.

The disclosed dual fuel injection valve is capable of independently and separately injecting two different fuels into the combustion chamber of an internal combustion engine. Each of the two fuels is injected into the combustion chamber through separate orifices that communicate directly to the combustion chamber. The dual fuel injection valve can provide independent control of the injection timing and fuel quantity for each of the two fuels. A first fuel can be a gaseous fuel and a second fuel can be a pilot fuel, preferably a liquid fuel that will auto-ignite in a compression ignition engine more readily than the gaseous fuel. The injection of the two fuels can be controlled such that, for example, at least some of the gaseous fuel is injected into the combustion chamber sequentially after the liquid fuel. Preferably, the gaseous fuel comprises more than 90% of the fuel consumed by the engine measured on an energy basis.

In preferred embodiments, the gaseous fuel is natural gas, but it can be another gaseous fuel that is cleaner burning than conventional diesel fuel such that substitution of the gaseous fuel for diesel (reducing the amount of diesel consumed to only pilot quantities) results in lower emissions of particulate matter and/or nitrogen oxides (NOx) compared to an equivalent conventional engine that burns only diesel fuel. Such a gaseous fuel can be hydrogen, propane, ethane, butane, methane, and mixtures thereof. The pilot fuel can be diesel fuel or another liquid fuel, such as, for example, dimethylether, bio-diesel or kerosene.

In the illustrated embodiments, the dual fuel injection valve is operated by using a high-pressure source of hydraulic fluid and at least one hydraulic fluid control valve. By operating one or more hydraulic fluid control valves, the pressure of the hydraulic fluid is manipulated in a control chamber to control the movements of at least one of the valve needles. A first valve needle moves between an open and a closed position for controlling the injection of the first fuel into the combustion chamber and a second valve needle moves between an open and a closed position for controlling the injection of the second fuel into the combustion chamber. The hydraulic fluid control valves are typically solenoid valves which are electrically-operated and electronically-controlled. Conventional electronic controls can be used to control the activation of the solenoids and to thereby control the timing and duration of the metering and injection events. Instead of a hydraulic actuator, other known types of actuators can be substituted for actuating at least one of the two valve needles, such as mechanical, electromagnetic, piezoelectric, or magnetostrictive actuators.

In preferred embodiments of the subject fuel injection valve, if the actuators are hydraulic actuators, the hydraulic liquid and the second fuel are preferably the same fluid whereby the second fuel and the hydraulic fluid passages within the fuel injection valve are connected to a high pressure liquid fuel manifold, known as a "common rail" when the same manifold serves a plurality of injection valves in a multi-cylinder engine.

To simplify the illustration of the internal fluid passages within the fuel injection valves, some of the schematic illustrations in the FIGS. show fuel injection valves with a plurality of inlets and outlets. Interior fluid passages can be employed to reduce the number or fluid inlets and drain ports within the valve body in an operatively equivalent structure.

Referring to the drawings, FIG. 1 shows an external side view of dual fuel injection valve 1 with two separate sets of orifices for separately injecting two different fuels. Fuel injection orifice 4 is one of a series for first fuel injection orifices for injecting a first fuel, such as natural gas, which serves as the main fuel. Fuel injection orifice 5 is one of series of second fuel injection orifices for separately injecting a second fuel that serves as a pilot fuel to assist with ignition of the first fuel. In this example, solenoids 2 and 3 actuate control valves that control the independent hydraulic actuation of the two fuel injection valves. Conventional electronic controls can be used to control the activation of solenoids 2 and 3 to time the injection of the two separate fuels into the combustion chamber. This view is schematic, meaning that it is not drawn to scale or physically accurate. For example, the exterior shape of the valve body can be made to fit the diameter and depth of the opening in the cylinder head of an internal combustion engine in which it is to be installed.

Figure 2:
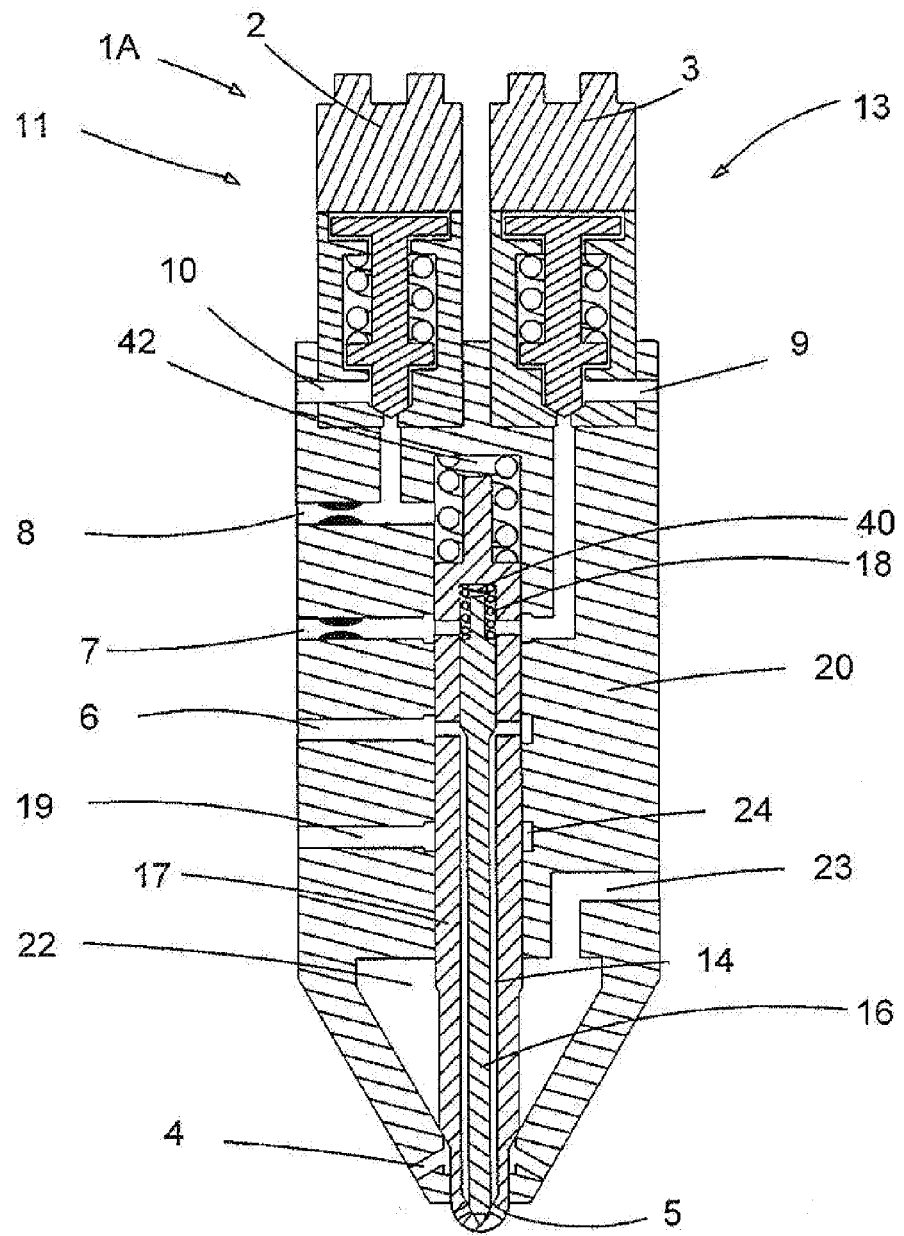
FIG. 2 illustrates a side view cross-section that is a schematic illustration of a prior art dual fuel injection valve with concentric needles comprising a freely rotating outer needle.

FIG. 2 is a schematic depiction of a side section view of a dual fuel injection valve with concentric needles. While an external view of this injection valve would be similar to what is shown in FIG. 1, the section view shown in FIG. 2 shows an inner valve assembly that is free to rotate about the longitudinal axis in accordance with what has been practiced in the prior art.

Injection valve 1A generally comprises the following features for controlling the flow of hydraulic fluid: (a) first fuel hydraulic fluid control valve 11, (b) second fuel hydraulic fluid control valve 13, (c) at least one hydraulic fluid inlet such as 7 and/or 8, (d) at least one drain port such as 9 and/or 10, (e) first fuel control chamber 42, and (f) second fuel control chamber 40.

Injection valve 1A comprises two concentric needles in valve body 20. Outer needle 17 is a hollow body disposed around inner needle 16. In preferred embodiments, outer needle 17 controls the direct injection of a first fuel into the combustion chamber and inner needle 16 controls the direct injection of a second fuel into the combustion chamber.

The hollow body that is outer needle 17 serves as the body for the inner valve assembly. Inner needle 16 is in the closed position when a sealing surface of inner needle 16 is urged against a seat that is an inner sealing surface of outer needle 17. Outer needle 17 is in the closed position when an outer sealing surface of outer needle 17 is urged against a seat that is an inner sealing surface of valve body 2. In FIG. 2 both inner and outer needles are illustrated in their closed position.

Fuel injection orifice 4 is one of a first series of orifices for directly injecting a first fuel into the combustion chamber, formed in injection valve body 20 at the end of injection valve 1A that protrudes into the combustion chamber (not shown). Fuel injection orifice 5 is one of a second series of orifices formed in the end of outer needle 17, which provide an opening for injecting the second fuel directly into the engine combustion chamber when the inner needle is in an open position. Injection orifices 4 and 5 and the associated respective ends of needles 17 and 16 are located proximate to each other at the end of injection valve 1A to provide immediate injection of first fuel and second fuel into the engine combustion chamber.

The first fuel is supplied to dual fuel injection valve 1A through inlet port 23 and flows into first fuel cavity 22 from where it can be injected directly into the combustion chamber. Second fuel is supplied to dual fuel injection valve 1A through inlet port 6 and flows into annular cavity 14 formed between inner needle 16 and outer needle 17, from where it is injected directly into the combustion chamber.

Differential pressures within injection valve 1A and particularly between first fuel cavity 22 and the other cavities within valve body 20 can be sealed by a fluid seal that is filled with a fluid maintained with a pressure equal to or preferably slightly higher than the pressure of the gaseous fuel stored in first fuel cavity 22. The sealing fluid can be supplied to seal fluid cavity 24 through seal fluid inlet 19, and in preferred embodiments the sealing fluid can be the second fuel so that seal fluid inlet 19 is not needed and can be replaced by internal passages connected to inlet port 6.

Figure 3:
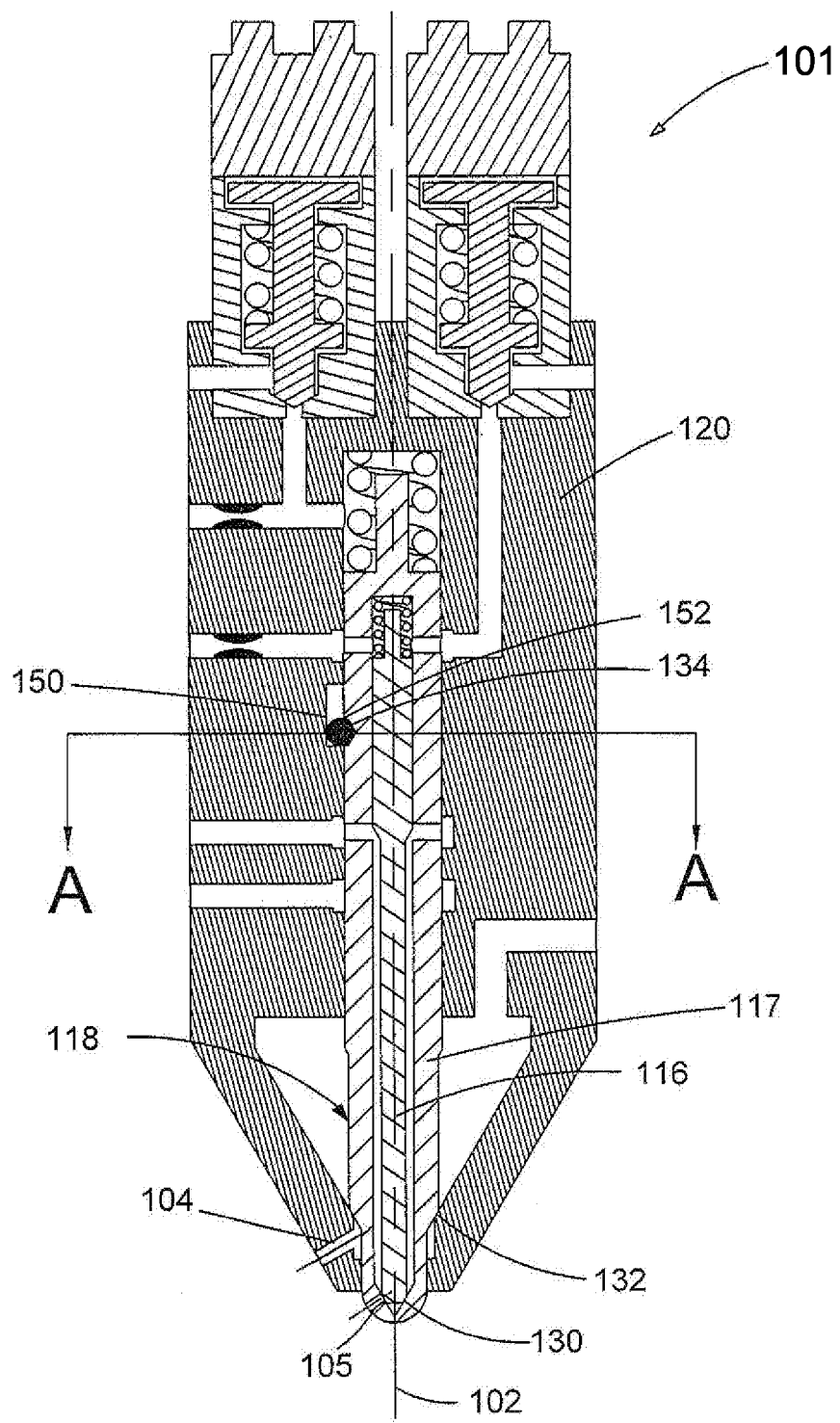
FIG. 3 shows a side view cross-section that is a schematic illustration of a preferred embodiment of a dual fuel injection valve having an outer needle which is held in a fixed orientation relative to the valve body.

Referring now to FIG. 3, a schematic side view cross section is shown that has an inner valve assembly that has some common elements with prior art injection valve 1A and a detailed description is not repeated for like components that function in a like manner. Like fuel injection valve 1A, fuel injection valve 101 has two concentric needles with the body of the inner valve assembly serving as the needle for the outer valve assembly. In addition, means is provided for separately and independently actuating the two valve assemblies and two series of orifices, spaced apart from each other, are provided for separately injecting two different fuels. The exterior schematic view shown in FIG. 1 could also be representative of an external side view of injection valve 101. The internal section view of FIG. 3 and the view through section A-A are needed to see the differences between injection valve 1A and injection valve 101. With injection valve 101, the inner valve assembly is held in a fixed orientation with respect to the outer valve assembly. That is, in FIG. 3, injection valve 101 comprises features that inhibit the inner valve assembly from rotating about longitudinal axis 102 and this maintains a constant radial angle relationship between the orientation of the first set of orifices and the second set of orifices.

A preferred embodiment of dual fuel injection valve 101, shown in FIG. 3, comprises valve body 120 and, in the center thereof, inner needle 116 and hollow outer needle 117, which surrounds inner needle 116, thereby providing a concentric needle assembly 118. There are advantages to a concentric needle arrangement but that a concentric arrangement is not essential. That is, a workable fuel injection valve could be made with an inner needle disposed within an outer needle but with the longitudinal center axis of the inner needle being offset from that of the outer needle, but the larger the offset the less desirable this would be, for example in terms of the strength and size of the overall valve assemblies.

Fuel injection orifice 104 is representative of a first series of fuel injection orifices that are provided at the end of injection valve body 120. In FIG. 3, the tip of this lower end of injection valve 101 that includes fuel injection orifice 104 is the part of valve body 120 that protrudes into a combustion chamber (not illustrated) when mounted in the cylinder head of an internal combustion engine (not illustrated). Fuel injection orifice 105 is representative of a second series of orifices located near the end of outer needle 117, being offset in the longitudinal direction lower than the first set of orifices, and thereby also protruding into the same combustion chamber. In an operating engine that has a plurality of cylinders one dual fuel injection valve is mounted with its tip protruding into the combustion chamber of each of the engine's cylinders for the separate and independent injection of the two fuels directly into each combustion chamber. In a preferred embodiment, the first fuel is a gaseous fuel, injected through the first series of orifices exemplified by fuel injection orifices 104. The gaseous fuel is preferably natural gas or other clean burning gas that is combustible in an engine, for example a suitable gaseous fuel can be selected from the group consisting of methane, propane, butane, hydrogen and mixtures thereof. The second fuel is a pilot fuel that will auto-ignite in a compression ignition engine more readily than the gaseous fuel. The second fuel is injected through orifices 105 and in preferred embodiments this second fuel can be, for example, diesel fuel, dimethylether, bio-diesel or kerosene.

Like most conventional needle valves of this type, inner needle 116 is free to rotate around longitudinal axis 102 and can be lifted, when actuated, from inner valve seat 130, defined by an inner surface of hollow outer needle 117. Unlike most conventional needle valves, and specific to dual fuel injection valves in which the outer needle is formed by the body of the inner valve assembly such that outer needle 117 houses the second series of orifices associated with the inner valve, the relationship between the orientation of the two series of orifices, can have a significant effect on combustion characteristics such as, for example, combustion efficiency and emissions (combustion products exhausted from the combustion chamber). Accordingly, in the disclosed embodiments of a dual fuel injection valve, it is advantageous to inhibit rotation of outer needle 117 around longitudinal axis 102. When outer needle 117 is lifted upwards and away from outer valve seat 132 the outer valve is opened and the first fuel is injected directly into a combustion chamber through the first series of fuel injection orifices exemplified by orifice 104.

Dual fuel injection valve 101 includes features which inhibit outer needle 117 from rotating about longitudinal axis 102, inhibiting rotation of outer needle 117 relative to valve body 120. When actuated, these features, which inhibit rotation, allow outer needle 117 to move freely in the direction of longitudinal axis 102 between a closed and an open position when outer needle 117 is lifted away from outer valve seat 132. In FIG. 3, the features which inhibit rotation of outer needle 117 comprise keying member 134 disposed between outer needle 117 and valve body 120 in an elongated channel formed by a recess in one of an outer surface of the outer needle and an inner surface of the valve body. In this embodiment, recess 150 is formed in an inner surface of the valve body and keying member 134 is held in a fixed position relative to outer needle 117. That is, the outer surface of outer needle 117 is shaped in the area pointed to by reference numeral 152 to receive keying member 134 and hold it in a fixed radial alignment as shown by the embodiments illustrated in FIGS. 4A-4G. When dual fuel injection valve 101 is assembled with keying member 134 disposed in recess 150, the boundaries of recess 150 hold keying member 134 and outer needle 117 in a fixed radial position relative to the elongated channel thereby inhibiting outer needle 117 from rotating relative to valve body 120 and establishing a fixed interlace angle between respective centerlines of the first series of orifices and the second series of orifices. Different engine designs and operating conditions can influence the desired interlace angle, but the experimental data collected by the applicant has shown that keeping a constant predetermined interlace angle between first fuel orifices and second fuel orifices is beneficial to the overall engine performance and particularly to increasing combustion efficiency to yield more complete combustion and reduce the emissions of unburned fuel. The value of the predetermined interlace angle for a specific engine can be set for example by testing that specific engine according to different operating conditions and testing different fixed interlace angles along with other variable such as, for example, different fuel rail pressures or different amounts of exhaust gas recirculation, to determine the interlace angle that best achieves the desired performance, combustion efficiency and emission levels.

Referring now to FIGS. 4A-4G, these are examples of alternative embodiments of keying members viewed through section A-A in FIG. 3. In these views it is shown how the keying member interacts with the recess to inhibit outer needle 117 from rotating relative to valve body 120. Throughout this disclosure like numbers are used to show like elements and if functionally the same descriptions of like elements may not be repeated herein. Elements that are similar in function but perhaps physically different can be identified by like numbers but with a letter suffix.

Figure 4A:
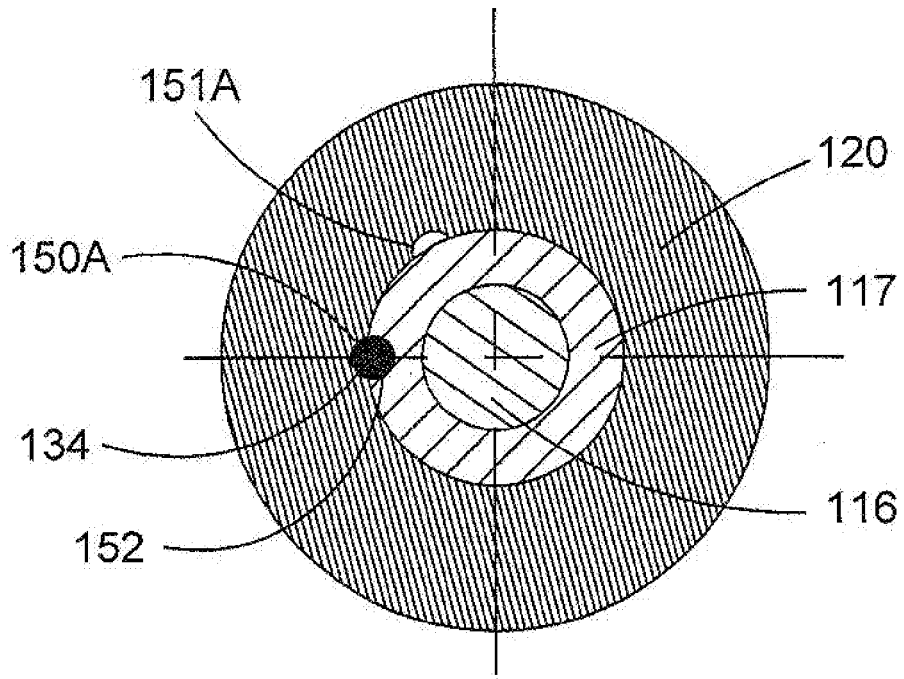
FIGS. 4A-4G are respective cross-section views at section A-A shown in FIG. 3, illustrating embodiments of at least one keying member for inhibiting rotation of the outer needle relative to the valve body.

In the embodiment shown in FIG. 4A, keying member 134 is preferably spherical in shape and recess 150A is shaped to conform to the surface of keying member 134. That is, recess 150A is a channel with rounded profile that has a radius substantially the same as that of keying member 134. This channel that defines recess 150A is elongated and extends perpendicular to the plane shown in FIG. 4A to allow outer needle 117 to move in a direction along the longitudinal axis when it is actuated to inject the first fuel. The materials selected for keying member 134 and valve body 120 and the clearances between keying member 134 and recess 150A are such that they allow sliding or rolling of keying member 134 within recess 150A without inhibiting movement of outer needle 117 in the longitudinal direction, as long as the edges of recess 150A inhibit a significant rotation of outer needle 117 relative to valve body 120. In this embodiment recess 151A is like recess 150 except that if keying member 134 were disposed in recess 151A instead of 150A it would result in a different interlace angle. As mentioned already, different interlace angles could be preferred for different engines. There could also be different interlace angles that are preferred for different cylinders in the same engine if different cylinders in the same engine have different characteristics. Recess 151A allows different interlace angles to be chosen for the same fuel injection valve, without adding extra parts and reducing the customization that might otherwise be required to allow this flexibility.

Figure 4B:
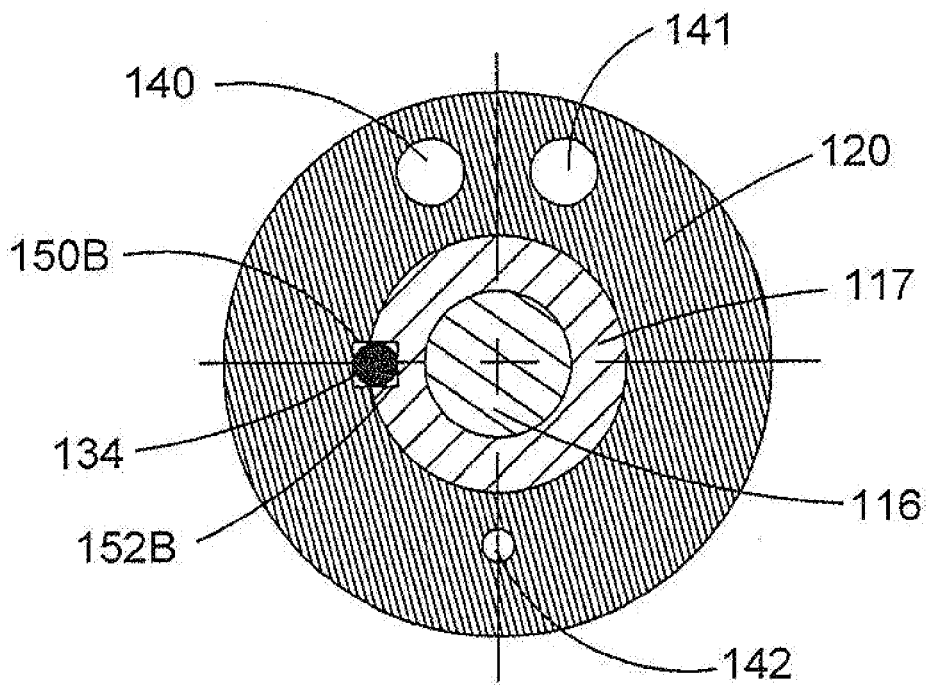

With reference to FIG. 4B, in this embodiment it is shown by recess 150B that the recess in the inner surface of the valve body does not need to be shaped to conform to the shape of keying member 134. In this embodiment recess 150B has a rectilinear profile such that the elongated channel has a slotted shape with square corners. This is to show that the profile of the recess is not important as long as it can interact with the keying member to restrict outer needle 117 from rotating about longitudinal axis 102 with respect to valve body 120. Similarly, this embodiment also shows that outer needle 117 can also be shaped at location 152B in a way that does not conform to the shape of keying member 134, as long as it functions to hold outer needle 117 with a fixed orientation for a constant interlace angle. For example a spherical keying member can be held at a fixed point on outer needle 117 by a transverse cylindrical well drilled into outer needle 117. FIG. 4B also shows that there can be internal passages 140, 141, 142 formed in valve body 120 through which, for example the two fuels, and the sealing fluid are conveyed to the respective fuel cavities and seal fluid cavity.

Figure 4C:
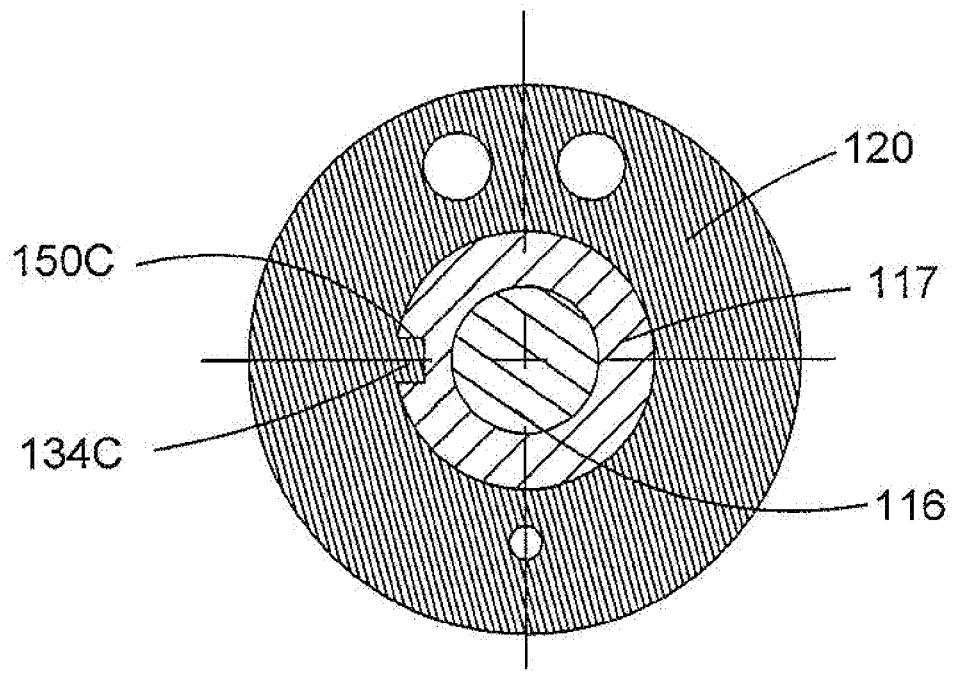

With reference to FIG. 4C, this embodiment shows that keying member 134C can be integral with valve body 120, and it can have a different shape. In this embodiment keying member 134C is rectilinear with square corners, but as taught by this example, different shapes are possible without deviating from the spirit of the claimed invention. In this embodiment because keying member 134C is integral with valve body 120, recess 150C is formed in the surface of outer needle 117.

Figure 4D:
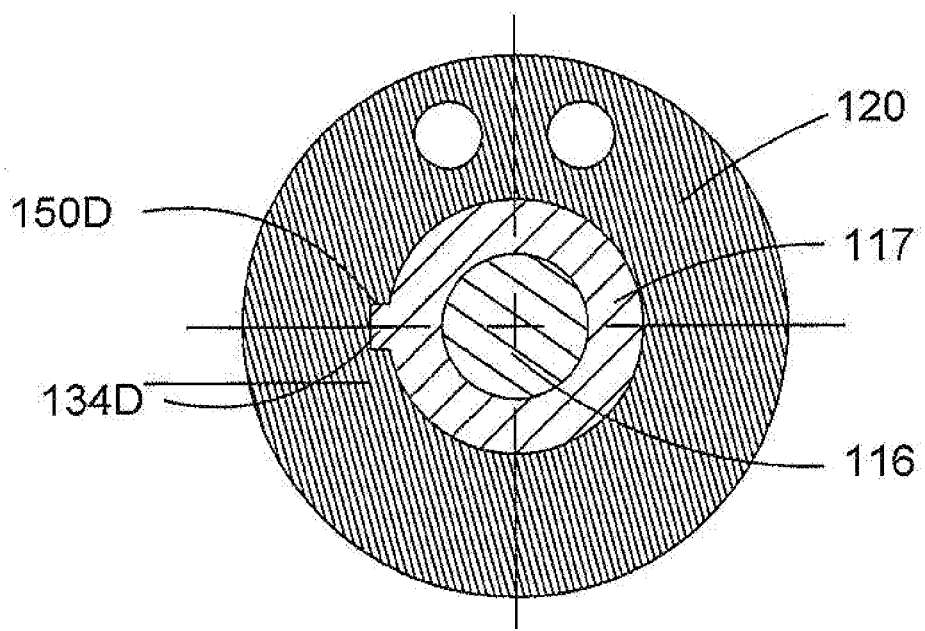

The embodiment of FIG. 4D is very similar to the embodiment of FIG. 4C except that in FIG. 4D, keying member 134D is integral with outer needle 117 and the elongated channel formed by recess 150D is formed in valve body 120.

Figure 4E:
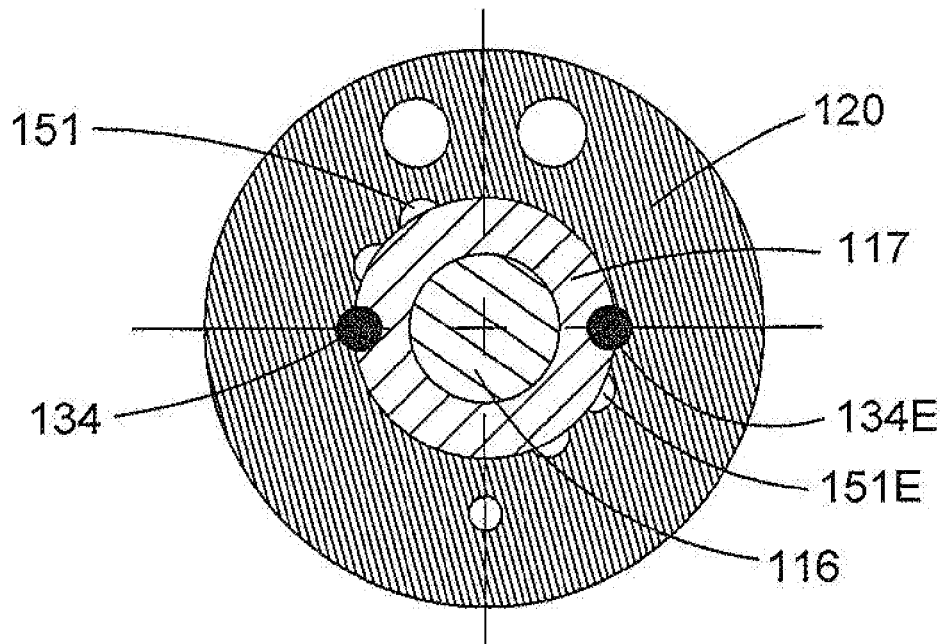
Figure 4F:
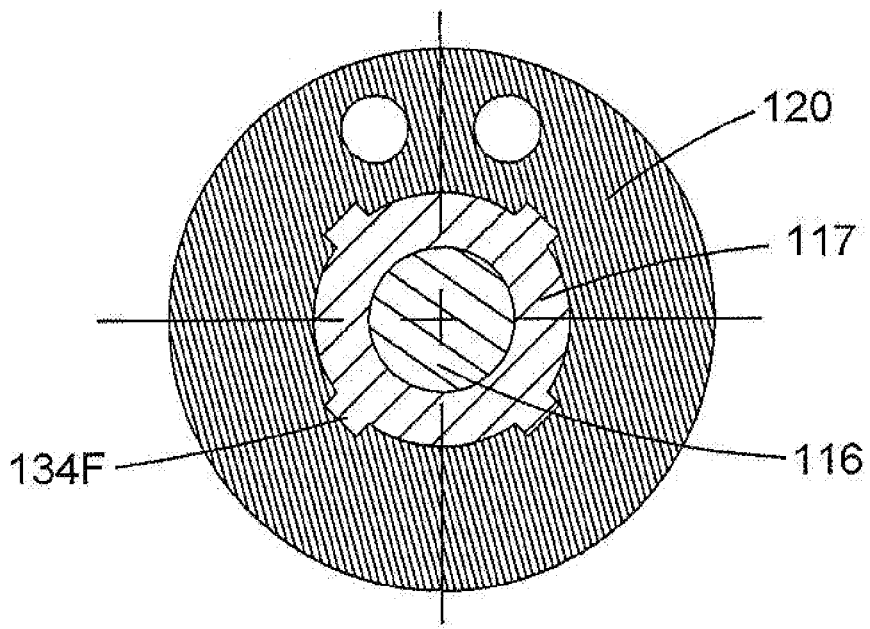

In the embodiments illustrated in FIG. 4A-4D only one keying member is disposed between outer needle 117 and valve body 120, as this is all that is needed to inhibit rotation of outer needle 117 relative to valve body 120. In other embodiments illustrated in FIGS. 4E-4G, more than one keying member can be employed, for example for the purpose of balancing and dispersing the forces acting on the valve components. Redundancy can also help to make the design more robust, for example if one of the keying members wears out. With reference to the embodiment illustrated in FIG. 4E, keying member 134 is paired with second keying member 134E. FIG. 4E also shows that valve body 120 can be made with additional recesses 151 and 151E to allow the flexibility to assemble the fuel injection valve with different interlace angles, depending upon the specific characteristics of the engine and/or the combustion chamber that the injection valve will be installed in. FIG. 4F shows an embodiment in which there are four keying members 134F.

Figure 4G:
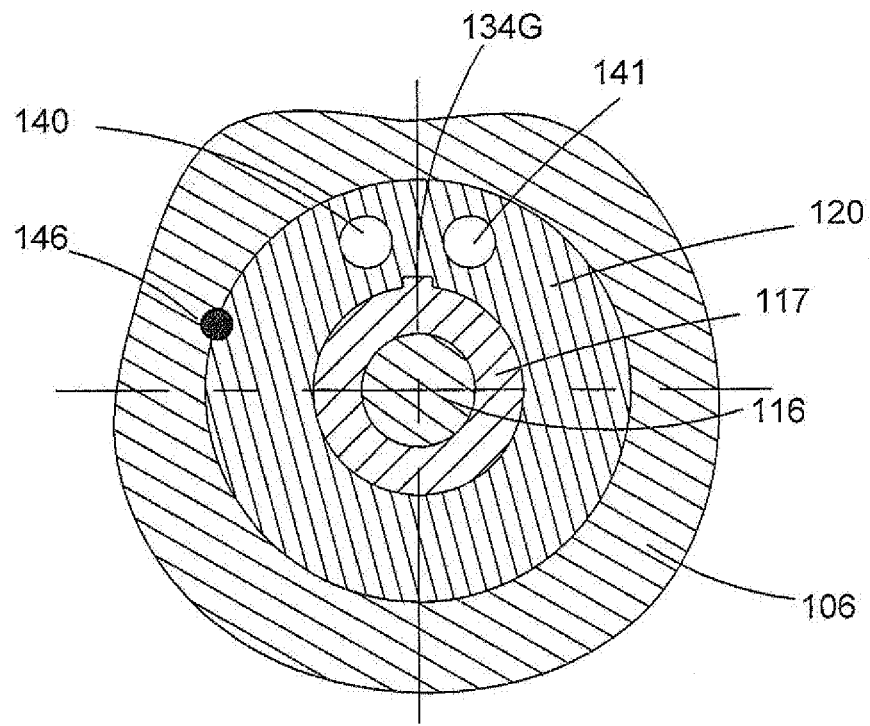

With reference now to FIG. 4G, an embodiment is shown where, in addition to keying member 134G between outer needle 117 and valve body 120, there is also fixing member 146 between valve body 120 and cylinder head 106. Combustion chambers can be designed with different shapes and are not always symmetrical. For example, as will be discussed below with respect to FIGS. 5B and 5C, if the dual fuel injection valve is positioned off center or at an angle, the fuel injection orifices may not be equally spaced or may have different sizes depending upon the direction that they are pointed in. In such circumstances, because the fuel injection orifices for the outer valve are located in the valve body, a specific orientation of the valve body with respect to the cylinder head is needed, and this specific orientation is achieved by employing fixing member 146. Even if the combustion chamber is physically symmetrical, the geometry of the combustion chamber, including the shape of the piston bowl and the placement of the intake and exhaust valves and how these factors affect turbulence and fluid dynamics within the combustion chamber, can determine that a specific orientation of the fuel injection orifices is preferred. In FIG. 4G one fixing member is employed between cylinder head 106 and valve body 120 and one keying member is employed between valve body 120 and outer needle 117. Like in FIGS. 4E and 4F other embodiments could use a plurality of keying or fixing members, but when a specific orientation is desired, the placement of a plurality of keying members cannot be symmetrical. That is, the keying members should be designed so that the fuel injection valve can only be assembled and installed in one configuration. For example, in FIG. 4G, a second keying member could be added at an angular spacing of 170 degrees from keying member 134G, but not with an angular spacing of 180 degrees. Alternatively, one keying member could be sized or shaped differently from the other keying member.

In some of the preferred embodiments, the keying member is shown as a spherical ball. This spherical ball can be made from a ceramic material with the requisite hardness and low rolling resistance to function in the manner described above. Metallic materials with suitable characteristics can also be selected, for example stainless steel or other material with a low friction coefficient.

As demonstrated by the illustrated, keying member 134 can be made in different shapes beyond those shown, such as, for example, another polygonal or another curvilinear shape such that the shapes of the keying member and the elongated channel complement and cooperate with each other to function in the same way described herein.

Figure 5A:
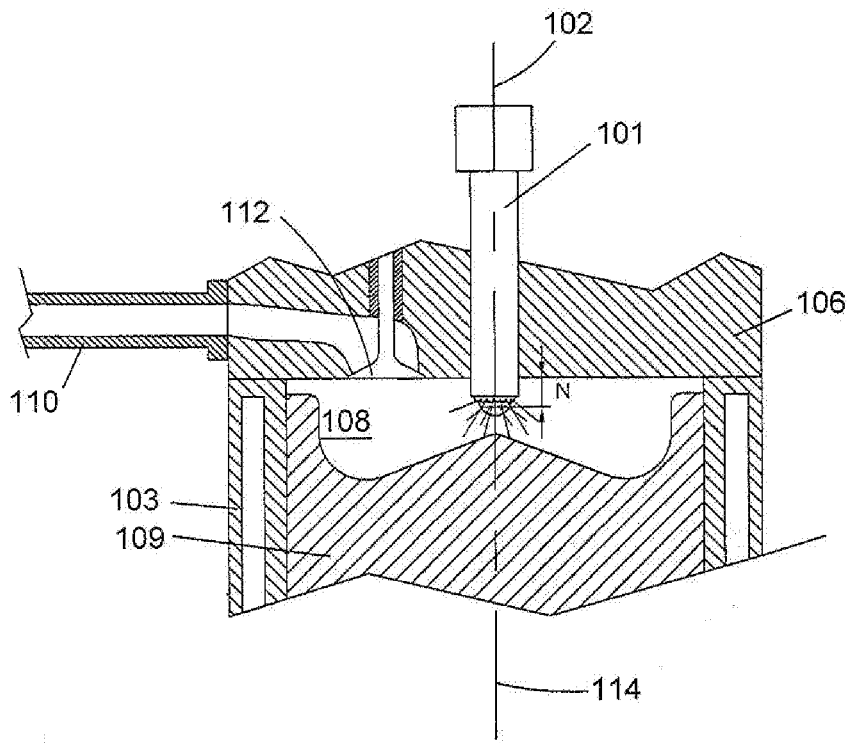
FIG. 5A-5C show respective side view cross-sections of an engine's cylinder head and combustion chamber, showing a dual fuel injection valve such as the one illustrated in FIG. 3, positioned at different locations within the combustion chamber and having different orientations.
Figure 5B:
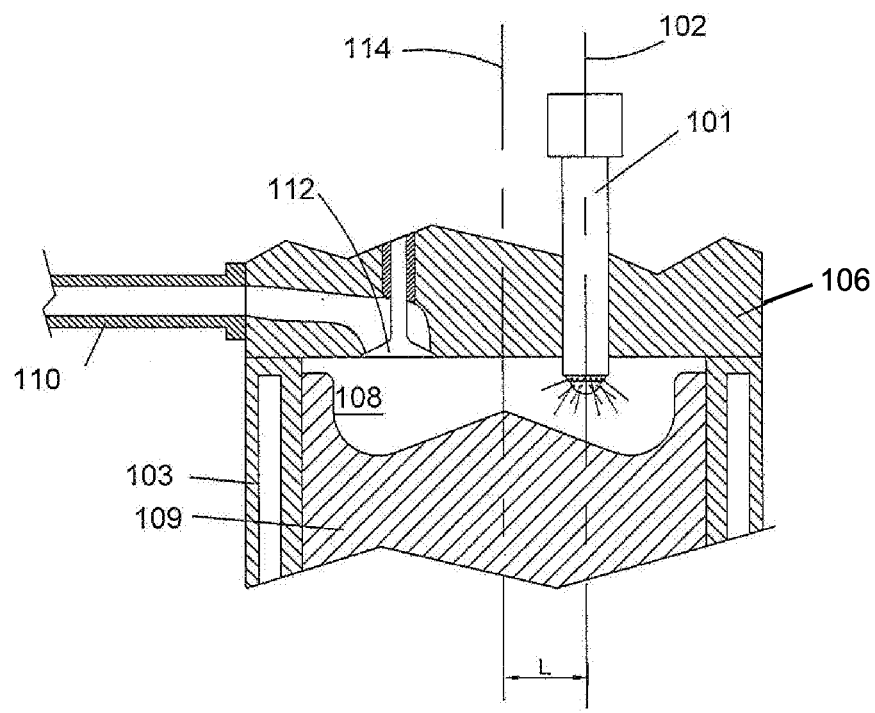
Figure 5C:
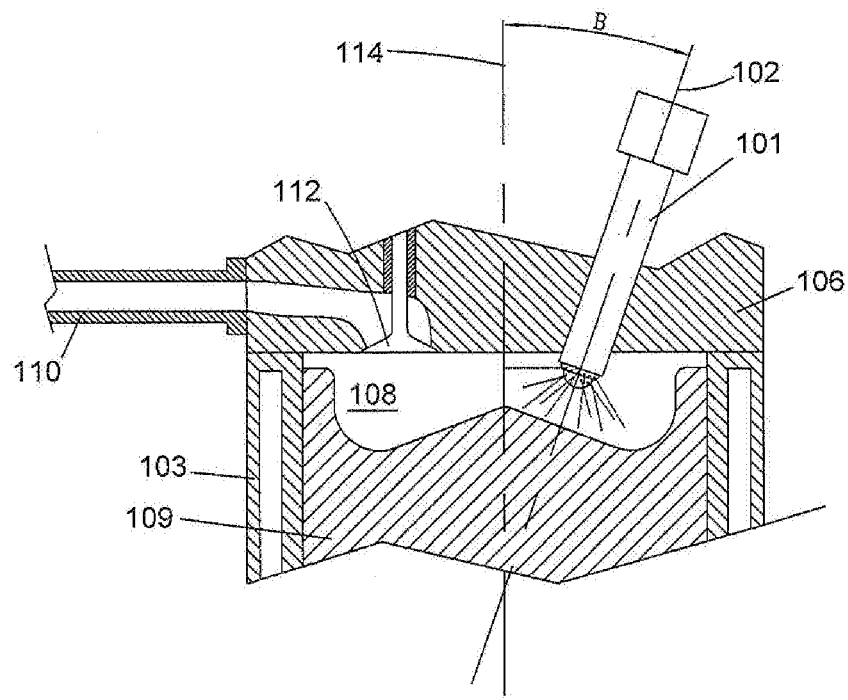

FIGS. 5A-5C show different arrangements for mounting a dual fuel injection valve 101 in a cylinder head of an engine. These schematic examples are intended to be demonstrative but should not be considered limiting since it will be understood that there are many different combustion chamber designs. With reference to FIG. 5A, dual fuel injection valve 101 is mounted in a bore provided in cylinder head 106, in a central position relative to combustion chamber 108. FIG. 5A also shows conventional elements present in the illustrated part of an internal combustion engine, for example, engine block 103, piston 109, intake manifold 110 and intake valve 112. The engine cylinder comprises other conventional elements, such as, for example, at least one exhaust valve and an exhaust manifold, which, for simplicity reasons, are not shown in this schematic view. Computer model simulations of a specific combustion chamber can be used to determine if it would be advantageous to select a specific orientation for the fuel injection orifices of the outer valve, and if so a keying member can be provided between the cylinder head and the valve body in addition to between the valve body and the outer needle.

With reference to FIG. 5B, when dual fuel injection valve 101 is mounted in the cylinder head in an off-center position, where its longitudinal axis 102 is offset at a distance L from center axis 114, then, in preferred embodiments, a specific orientation of the fuel injection orifices is selected to cause a more even distribution of fuel within the combustion chamber and to limit impingement of the fuel on the combustion chamber surfaces. That is, because the cylinder wall is much closer to one side of dual fuel injection valve 101, a lesser number of orifices or orifices with a smaller diameter might be oriented in the direction of the nearer wall. The orientation is achieved by using at least one keying member between cylinder head 106 and valve body 120 as exemplified in FIG. 4G.

FIG. 5C shows an embodiment where dual injection valve 101 is placed in a tilted position (at an angle B) relative to axis 114 of combustion chamber 108. Like in the embodiment shown in FIG. 5B, when dual fuel injection valve 101 is at an inclined angle, to achieve the desired fuel distribution and combustion characteristics within the combustion chamber it can be advantageous to select a specific orientation of the fuel injection orifices, for example so that the orifices on one side of the fuel injection valve are oriented with a different angle with respect to the valve body so that the fuel jets do not impinge upon cylinder head 106 or on piston 109.

In the disclosed embodiments, the first and second series of orifices can comprise several injection orifices equally spaced around the circumference of the valve tip. In other embodiments, for example in the embodiments disclosed in FIGS. 5B and 5C, orifices which are part of second series of orifices 105 or first series of orifices 104 do not have to be equally spaced around the circumference of the end of outer needle 117 and, respectively, of the end of valve body 120. For example, the distance or the angle between the centerlines of such orifices can vary from one pair of adjacent orifices to the next.

Figure 6:
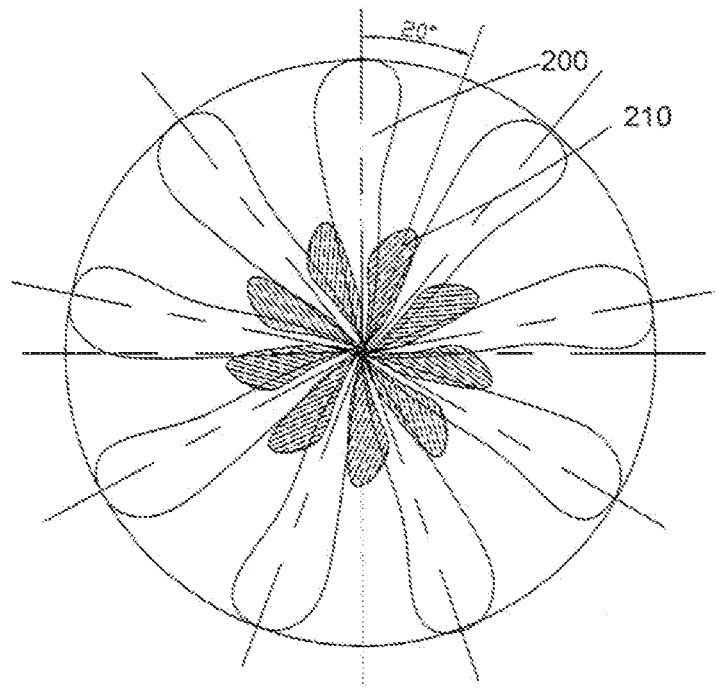
FIG. 6 shows an overhead view of a combustion chamber showing fuel jets injected by the dual fuel injection valve illustrating an interlace angle of 20 degrees.

FIG. 6 shows an overhead view of the combustion chamber to illustrate what is meant by the interlace angle. The first fuel jets are the larger jets indicated by reference numeral 200 and the second fuel jets are the smaller jets indicated by reference numeral 210. The interlace angle is the angle measured in this overhead view between a centerline of one of the orifices of the first series of fuel injection orifices (those associated with the first fuel) and the centerline of the nearest one of the orifices of the second series of fuel injection orifices. In this embodiment an interlace angle of 20 degrees is shown. The fuel jets are shown with this orientation in this overhead view to illustrate the interlace angle, but it should be noted that these fuel jets are vertically offset in a plan perpendicular to this overhead view such that the two different fuels are injected separately directly into the combustion chamber. In preferred embodiments, the first fuel constitutes the main fuel, such as natural gas, representing on average about 95% of the fuel consumed by an engine on an energy basis. The second fuel is a pilot fuel that is auto-ignitable at the pressures and temperatures found in the combustion chamber when the piston is near top dead center after the engine's compression stroke. In FIG. 6, the number of first fuel jets is equal to the number of second fuel jets injected into the combustion chamber because in this embodiment the number of orifices 104 in the first series is equal to the number of orifices 105 in the second series. In the illustrated embodiment, the orifices are equally distributed around the circumference of the end of valve body and, respectively, of the end of outer needle which is facing the combustion chamber.

Experiments done on an engine with almost no swirl comprising the present dual fuel injection valve have shown that for an injection valve with nine equally spaced pilot fuel orifices and nine equally spaced gaseous fuel orifices, good results in lowering methane emissions and improving combustion stability and engine performance predictability can be achieved with an interlace angle of 20 degrees. In the experiments conducted on such an engine, the first fuel injected through orifices 104 was natural gas and second fuel, injected through orifices 105, was a pilot fuel, more specifically diesel fuel. The experiments conducted with an injection valve with such a configuration have shown that the gaseous fuel and pilot fuel jet distribution within the combustion chamber was such that the fuel jets have an optimum contact area between pilot fuel sprays and the natural gas jets. Such an optimum contact area between the pilot fuel jets and the gaseous fuel jets is achieved when the equivalence ratio measured within the boundary volume between the jets has a value within a range of 0.7 and 2. Because gaseous fuels such as natural gas have a lower cetane number than traditional diesel fuel, ignition of the gaseous fuel is initiated by contact with the hot pilot fuel flame or its burned products. Therefore the distribution and evolution of the pilot fuel vapor with respect to the natural gas plays a role in the ignition of natural gas. The contact area between the fuel jets influences the gaseous fuel combustion and the heat release rate, and implicitly affects the engine's methane emissions.

Figure 7:
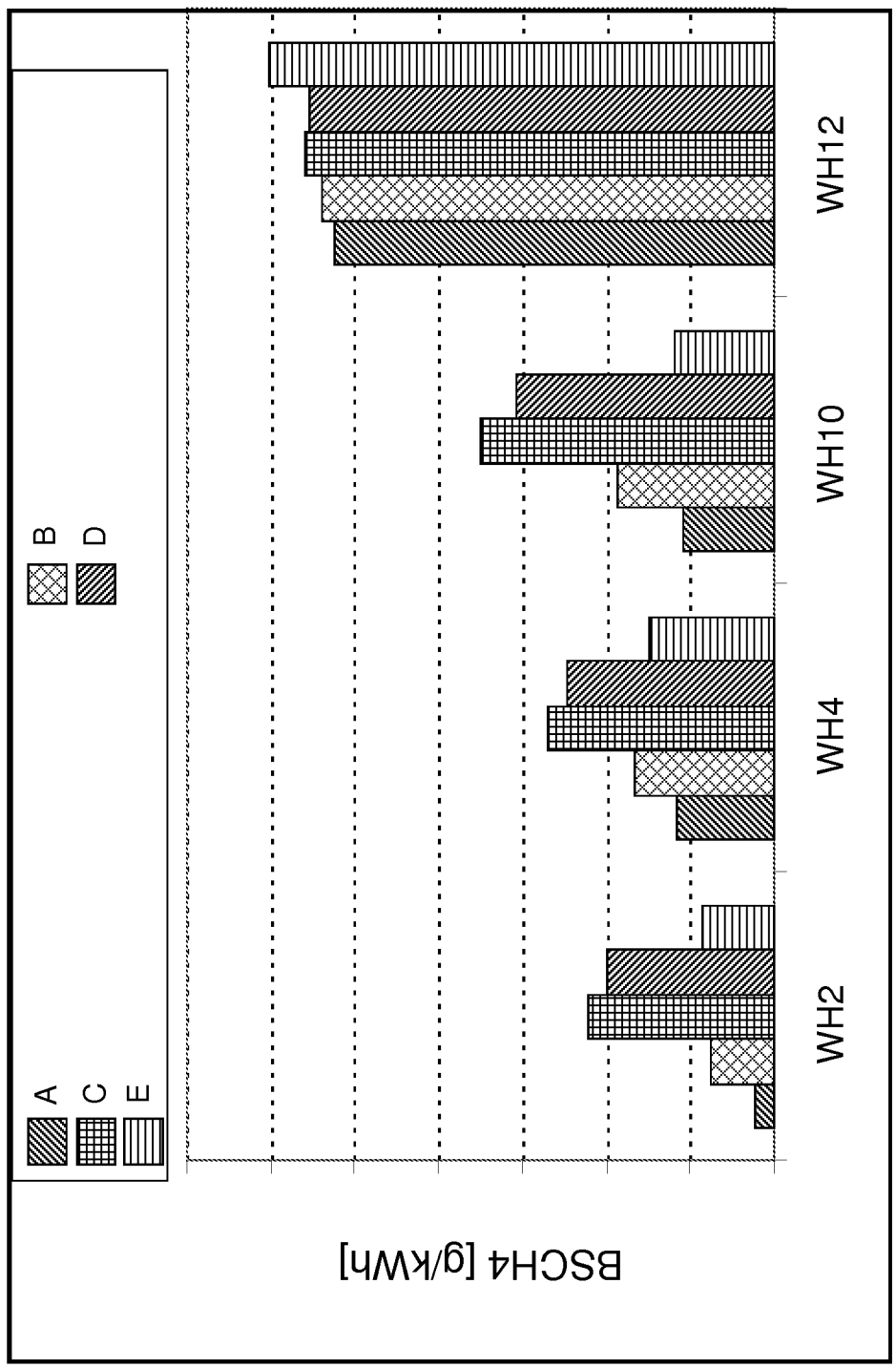
FIG. 7 is a chart that shows experimental test data collected from an engine designed with substantially no swirl, with the different bars representing the test results for different dual fuel injection valve designs.

Several experimental tests have been conducted employing an engine with almost no swirl for different engine operating modes, in accordance with the World Harmonized Stationary Cycle ("WHSC"). The WHSC is a steady-state test cycle, with a sequence of steady-state engine test modes (known as WH2, WH4, and so on) with defined speed and torque criteria. The results of these tests, more specifically the methane emissions, which are characterized as Brake Specific Methane Emissions ("BSCH4") are illustrated in FIG. 7. The experiments were conducted on two different designs of the injection valve: one which allows injecting both gaseous fuel and pilot fuel at an injection angle of 18 degrees, and one which allows injecting both gaseous fuel and pilot fuel at an injection angle of 21 degrees. The injection angle is defined herein as the angle measured in side view between the centerline of a fuel jet originating from a fuel injection orifice and a plane that is transverse to the longitudinal axis of the combustion chamber and cylinder (centerline 114 in FIG. 5A). Both designs of the injection valve tested had nine equally spaced fuel injection orifices in each of the a first and second series of fuel injection orifices for injecting gaseous fuel and pilot fuel respectively. Two injection valve arrangements were tested. In one arrangement a washer was used a as a spacer interposed between a shoulder of the injection valve and the cylinder head such that the nozzle end of the injection valve protrudes less into the combustion chamber compared to the injection valves not employing a washer. For example, the distance between the transverse plane defined by the cylinder head and the second series of fuel injection orifices, defined as the nozzle orifice offset distance, is measured and identified as "N" in FIG. 5A.

The test conditions for each set of test results A, B, C, D and E, which are represented in FIG. 7 from left to right for different engine test modes (WH2, WH4, WH10, WH12), are summarized in the table below:

| | |
|---|---|
| A | Fuel Injection Angle = 21 degrees<br>Interlace angle = 20 degrees<br>No washer |
| B | Fuel Injection Angle = 21 degrees<br>Interlace Angle = 20 degrees<br>Washer = 0.5 mm thick |
| C | Fuel Injection Angle = 18 degrees<br>Interlace Angle = 20 degrees<br>Washer = 0.5 mm thick |
| D | Fuel Injection Angle = 18 degrees<br>Interlace angle = 20 degrees<br>No washer |
| E | Fuel Injection Angle = 21 degrees<br>Interlace angle = 0 degrees<br>No washer |

The test results show that interlace angle, the fuel injection angle and the distance of the fuel injection orifices from the cylinder head all appear to influence combustion characteristics and methane emissions. The arrangement that resulted in the lowest methane emissions, as illustrated in FIG. 7 was achieved with an arrangement with a fuel injection angle of 21 degrees, with no washer and an interlace angle of 20 degrees, indicated in FIG. 7 as "A".

The engine on which the above experiments were conducted is an engine for which almost no swirl or little swirl is produced in the intake manifold when air is drawn into the combustion chamber. For other engines that have swirl plates placed in the intake manifold or for which the shape of the intake manifold by itself generates turbulence in the air flow passing thereto towards the combustion chamber (for example, helical shaped intake ports) different predetermined interlace angles might produce better results and the values of such predetermined interlace angles will be determined based on the modelling or test results of such engines.

Figure 8:
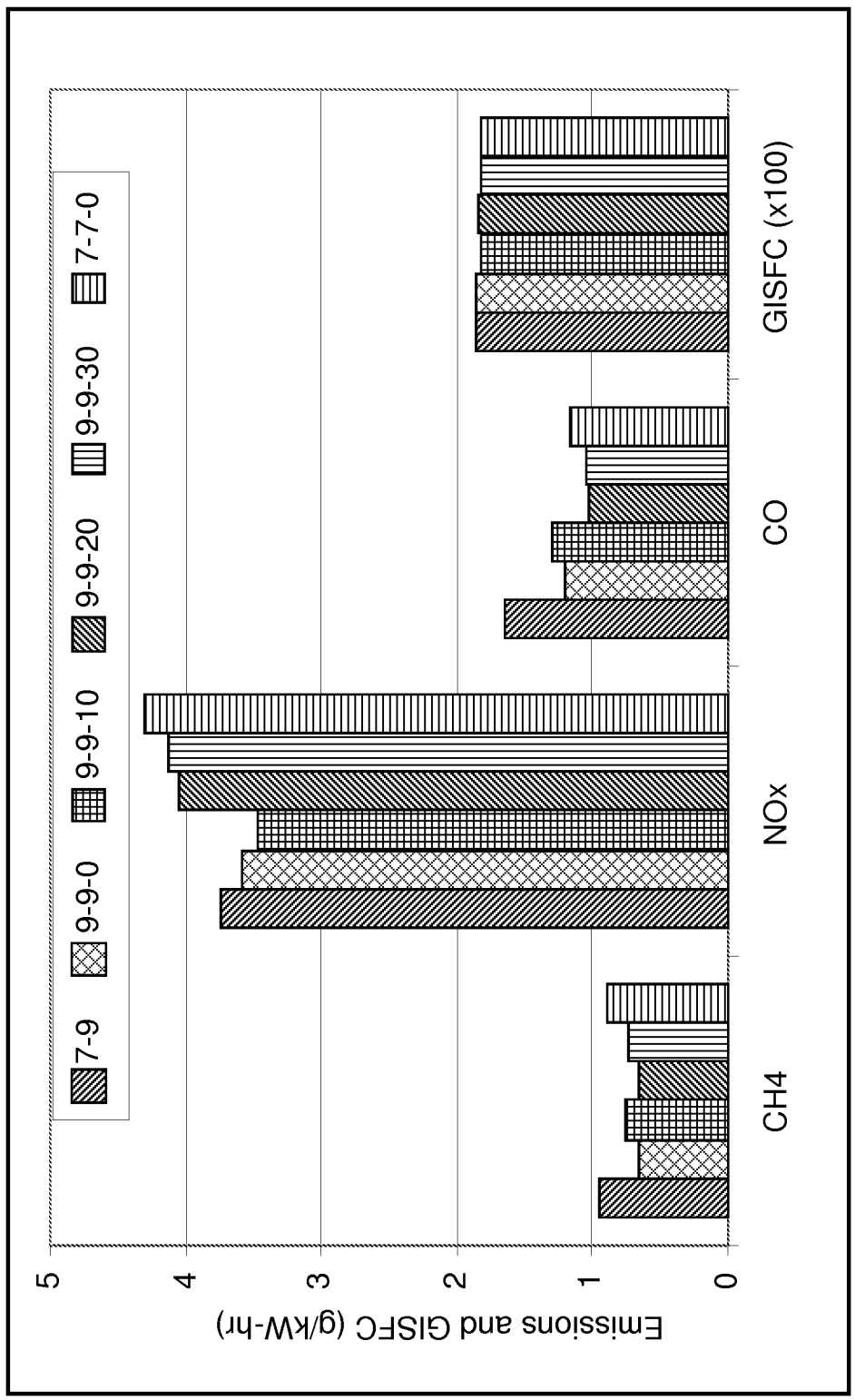
FIG. 8 is a chart that shows experimental test data collected from an engine designed with swirl, with the different bars representing the test results for different dual fuel injection valve designs.

Additional experiments were conducted on another type of engine, more specifically on an engine with a swirl number of about 1.5. The swirl number is defined as the ratio between the air swirl rotation rate and the engine rotation. The unweighted average of emissions and fuel consumptions (GISFC—Gross Indicated Specific Fuel Consumption) for the different test conditions are illustrated in FIG. 8. In FIG. 8, "7-9" represents the design of an injection valve where the outer needle is allowed to rotate relative to the valve body and having 7 orifices for pilot fuel injection and nine orifices for gaseous fuel injection. A 9-9 design refers to an injection valve comprising nine equally spaced orifices for gaseous fuel injection and nine equally spaced orifices for pilot fuel injection and a 7-7 design refers to an injection valve comprising seven equally spaced orifices for gaseous fuel injection and seven equally spaced orifices for pilot fuel injection. As in the previous example, the gaseous fuel employed in the testing was natural gas and the pilot fuel was diesel fuel. The engine was tested at several different predetermined interlace angles, for example, 0, 10, 20 and 30 degrees, as indicated in FIG. 8. A simultaneous reduction in both methane and NOx emissions was achieved with a 9-9-0 design (a series of first nine equally spaced orifices for gaseous fuel injection, nine equally spaced orifices for pilot fuel injection and an interlace angle of 0 degrees). The tests performed on the 9-9 configuration showed better results in methane emission reduction than the tests performed on a 7-7 configuration of the injection valve, more specifically an injection valve with 7 equally spaced orifices for gaseous fuel injection and 7 equally spaced orifices for pilot fuel injection. In regards to the preferred interlace angle it was determined that the most noticeable reduction in methane emissions was achieved with an interlace angle of 0 degrees and with an interlace angle of 20 degrees, as illustrated in FIG. 8.

Figure 9:
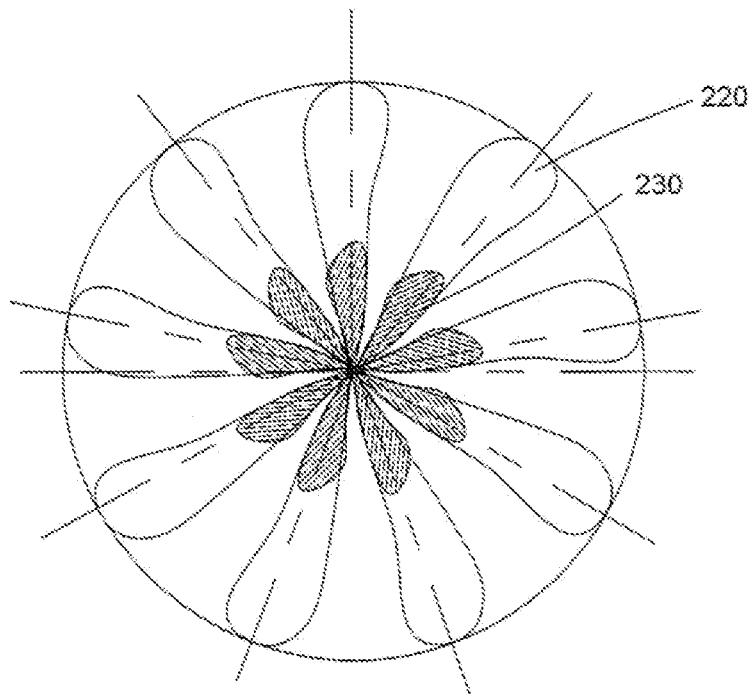
FIG. 9 shows an overhead view of a combustion chamber showing the fuel jets injected by the dual fuel injection valve illustrating an interlace angle of zero degrees.

FIG. 9 shows a view illustrating the orientation of the fuel jets when they are injected by a dual fuel injection valve into the combustion chamber when the interlace angle between gaseous fuel jets 220 and diesel fuel jets 230 is 0 degrees and when each of the first and second series of orifices comprises nine holes. The fuel jets are shown with this orientation to illustrate the interlace angle, but it should be noted that while these fuel jets overlap in this overhead view, because the two separate series of orifices for the two different fuels are vertically offset in a plan perpendicular to this overhead view such that the two different fuels are injected separately directly into the combustion chamber, diesel fuel jets 230 are not enveloped within gaseous fuel jets 220. Also, factors such as timing and swirl cause the fuel jets to disperse within the combustion chamber. For example, with an engine combustion chamber that is designed to promote swirl, if diesel fuel jets 230 are injected first, the fuel jets will be carried in the direction of the swirl so they will not be in the same location when gaseous fuel jets 220 are injected.

As discussed above when discussing the desired range for equivalence ratio in the contact areas, from combustion modeling with a dual fuel injection valve, the applicants believe that the desired result is for the edges of the diesel fuel sprays to be close enough to the edges of the gaseous fuel sprays to promote ignition of the gaseous fuel while allowing both fuels to mix with enough oxygen to fuel combustion. If there is too much overlap of the fuel jets this will inhibit combustion by limiting fuel-oxygen mixing. Conversely, if the diesel fuel sprays are too far from the gaseous fuel sprays this will inhibit ignition of the gaseous fuel. Accordingly, while certain interlace angles are disclosed for arrangements that were found to work with certain engines that were tested, for a specific engine the specific interlace angle for a dual fuel injection valve that is needed to achieve the advantages claimed herein will depend upon the specific characteristics of the engine, such as the amount of swirl, the size of the combustion chamber and the number of nozzle orifices, and the nozzle orifice offset distance.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A dual fuel injection valve for separately injecting two different fuels into a combustion chamber of an internal combustion engine comprising:
(a) a valve body;
(b) a hollow outer needle disposed within said valve body, said outer needle having a longitudinal axis along which it is movable between a closed position and an open position for injecting a first fuel directly into said combustion chamber through a first series of orifices located at an end of said valve body which faces said combustion chamber;
(c) an inner needle disposed within said outer needle, said inner needle having a longitudinal axis along which it is movable between a closed position and an open position for injecting a second fuel directly into said combustion chamber through a second series of orifices located at an end of said outer needle which faces said combustion chamber;
(d) an actuator assembly operative to move said inner needle and said outer needle between their respective closed and open positions to separately inject an amount of pilot fuel and an amount of gaseous fuel into said combustion chamber, and
(e) a keying member disposed between said outer needle and said valve body in an elongated channel formed by a recess in one of an outer surface of said outer needle and an inner surface of said valve body, said keying member being held in a fixed radial position relative to said elongated channel to inhibit said outer needle from rotating relative to said valve body.

2. The dual injection valve of claim 1, wherein said keying member is an integral part of said outer needle.

3. The dual injection valve of claim 1, wherein said keying member is an integral part of said valve body.

4. The dual fuel injection valve of claim 1, wherein said keying member is a ceramic ball.

5. The dual fuel injection valve of claim 1, wherein said keying member has a polygonal cross-section.

6. The dual fuel injection valve of claim 1, wherein said elongated channel is shaped to conform to the shape of said keying member.

7. The dual fuel injection valve of claim 1, wherein a plurality of keying members are disposed between said outer needle and said valve body and each of said plurality of keying members is disposed in an elongated channel formed by a recess in one of an outer surface of said outer needle and an inner surface of said valve body, each of said keying members being held in a fixed radial position relative to its respective elongated channel to inhibit said outer needle from rotating relative to said valve body.

8. The dual fuel injection valve of claim 1, wherein said orifices from said first series of orifices are equally spaced radially around said end of said valve body and said orifices from said second series of orifices are equally spaced radially around said end of said hollow outer needle.

9. The dual fuel injection valve of claim 1, wherein the number of orifices in said first series of orifices located at said end of said valve body is equal to the number of orifices in said second series of orifices located at said end of said hollow outer needle.

10. The dual fuel injection valve of claim 9, wherein said number of orifices is 9.

11. The dual fuel injection valve of claim 9, wherein a fixed interlace angle established between respective centerlines of said first series of orifices and said second series of orifices is set between 0 degrees and 20 degrees.

12. The dual fuel injection valve of claim 9, wherein a fixed interlace angle established between respective centerlines of said first series of orifices and said second series of orifices is one of 0 degrees and 20 degrees.

13. The dual fuel injection valve of claim 1, wherein said outer surface of said outer needle is provided with at least one additional recess, each recess forming an elongated channel wherein said keying member can be disposed to thereby establish a different fixed interlace angle.

14. The dual fuel injection valve of claim 1, wherein said inner surface of said valve body is provided with at least one additional recess, each recess forming an elongated channel wherein said keying member can be disposed to thereby establish a different interlace angle.

15. The dual fuel injection of claim 1, wherein a fixed interlace angle established between respective centerlines of said first series of orifices and said second series of orifices is determined based on at least one of the following:
   (a) an injection angle at which first fuel or second fuel are injected into the combustion chamber,
   (b) an engine swirl number,
   (c) the number of orifices in said first series or said second series of orifices, or
   (d) a nozzle orifice offset distance.

16. The dual fuel injection valve of claim 15, wherein said fixed interlace angle is set such that an equivalence ratio measured within a boundary volume between one fuel jet of first fuel injected in said combustion chamber and a second fuel jet injected in said combustion chamber, neighboring said first fuel jet, has a value within a range of 0.7 and 2.

17. The dual fuel injection valve of claim 1, wherein all orifices in said first series of orifices are equal in size.

18. The dual fuel injection valve of claim 1, wherein all orifices in said second series of orifices are equal in size.

19. The dual fuel injection valve of claim 1, wherein said first series of orifices are vertically offset from said second series of orifices along the longitudinal axis of said injection valve.

20. The dual fuel injection valve of claim 1, wherein a fixing member is disposed between said valve body and a cylinder head of said engine where said valve body is located to inhibit the relative movement between said valve body and said cylinder head.

21. The dual fuel injection valve of claim 1, wherein orifices in said first series of orifices are not equal in size.

22. The dual fuel injection valve of claim 1, wherein said injection valve is positioned off-center relative to the longitudinal axis of said combustion chamber or wherein the longitudinal axis of said injection valve is inclined relative to the longitudinal axis of said combustion chamber.

23. The dual fuel injection valve of claim 1, wherein said hollow outer needle is concentrically arranged with respect to said inner needle.

24. The dual fuel injection valve of claim 1, wherein said first fuel is a gaseous fuel selected from the group consisting of natural gas, hydrogen, propane, ethane, butane, methane, and mixtures thereof.

25. The dual fuel injection valve of claim 1, wherein said second fuel is a pilot fuel selected from the group consisting of diesel fuel, dimethylether, bio-diesel and kerosene.

26. A method of separately injecting two different fuels through a dual fuel injection valve into a combustion chamber of an internal combustion engine comprising injecting at least one first fuel jet directly into said combustion chamber through an orifice from a first series of orifices located at an end of a valve body of said dual fuel injection valve which faces said combustion chamber and injecting at least one second fuel jet directly into said combustion chamber through an orifice from a second series of orifices located at an end of an outer needle disposed within said valve body of said dual fuel injection valve which faces said combustion chamber, wherein an interlace angle between said first jet of first fuel and said second jet of second fuel, neighboring said first jet, is set at a fixed predetermined value by disposing a keying member between said outer needle and said valve body to inhibit said outer needle from rotating relative to said valve body.

27. The method of claim 26, further comprising injecting an equal number of first fuel jets and second fuel jets into said combustion chamber.

28. The method of claim 27, wherein the number of first fuel jets and the number of second fuel jets is 9.

29. The method of claim 28, wherein said interlace angle is set between 0 degrees and 20 degrees.

30. The method of claim 28 wherein said interlace angle is either 20 degrees or 0 degrees.

31. The method of claim 26 wherein said first fuel is a gaseous fuel selected from the group consisting of natural gas, hydrogen, propane, ethane, butane, methane, and mixtures thereof and said second fuel is a pilot fuel selected from the group consisting of diesel fuel, dimethylether, bio-diesel and kerosene.

* * * * *